United States Patent [19]

Russ, Sr. et al.

[11] 3,858,949
[45] Jan. 7, 1975

[54] ENDLESS TRACK AND SLIDE THEREFOR

[75] Inventors: Paul E. Russ, Sr., Englewood; Donald R. McComber; Philip M. Patterson, both of Littleton, all of Colo.

[73] Assignee: The Gates Rubber Company, Denver, Colo.

[22] Filed: Oct. 26, 1973

[21] Appl. No.: 410,125

Related U.S. Application Data

[62] Division of Ser. No. 279,163, Aug. 9, 1972, Pat. No. 3,815,960.

[52] U.S. Cl............................... 305/35 EB, 305/38
[51] Int. Cl............................................. B62d 55/22
[58] Field of Search.......................... 305/35 EB, 38

[56] References Cited
UNITED STATES PATENTS

| 3,118,709 | 1/1964 | Case | 305/57 X |
| 3,480,339 | 11/1969 | Kell | 305/35 EB |
| 3,722,961 | 3/1973 | Haley | 305/38 |
| 3,738,714 | 6/1973 | Ness | 305/35 EB |
| 3,774,979 | 11/1973 | Harris | 305/35 EB |
| 3,781,067 | 12/1973 | Dodson | 305/35 EB |

Primary Examiner—Philip Goodman
Attorney, Agent, or Firm—H. W. Oberg, Jr.; Raymond Fink; Curtis H. Castleman, Jr.

[57] ABSTRACT

An integrally molded track having one or more strips of insulating material disposed near at least part of the inner surface of the track. A perforate slide bar containing a heat sensitive lubricant system constantly or intermittently engages supports, and automatically lubricates the track.

3 Claims, 3 Drawing Figures

PATENTED JAN 7 1975 3,858,949

ENDLESS TRACK AND SLIDE THEREFOR

This is a division of application Ser. No. 279,163, filed Aug. 9, 1972, now U.S. Pat. No. 3,815,960.

BACKGROUND OF THE INVENTION

The invention relates to wheel substitute land vehicles, but more particularly, the invention relates to an endless track having a heat insulating material disposed at or near at least a part of its inner surface and a perforate slide bar for supporting and channeling a lubricant to the endless track.

Increasing interest in slide bar type suspension systems for endless tracks is being shown for snowmobile type vehicles. The slide bar suspension provides a firm platform for supporting the track. Similarly a strong interest is being set forth for integrally molded track. The integrally molded track may advantageously have integrally molded drive lugs and intricate tread patterns which are not presently achievable with tracks of the grouser-bar type. When a slide bar system is used to support an integrally molded track of the polymeric type, a problem may arise. Sliding friction between the track and slide bars may generate sufficient heat to char or melt the polymeric material within a short period of time which destroys the track even when nylon duck fabric suggested in U.S. Pat. No. 3,118,709 is used. Where the track and slide bar combination is used over terrain such as snow, slush or ice, track disintegration may be prolonged. Oftentimes it is desirable or necessary to use a track laying vehicle having a slide bar suspension and polymeric track over non-lubricous terrain.

SUMMARY OF THE INVENTION

An endless track is provided which has an insulating material disposed at or near over at least a part of the track inner surface. A hollowed perforated slide bar is arranged to constantly or intermittently contact and support the inner surface of the track. In a preferred embodiment, a liquefiable lubricant disposed within the slide bar becomes fluid and is excreted through the perforations to lubricate the track when sufficient heat is generated between the slide bar and track. Optionally a liquid lubricant may be disposed to the track by means of a heat sensitive valve. The insulating material inhibits charring, disintegration or melting of the polymeric material during the heat build-up process.

Accordingly an object of the invention is to provide a system where an integrally molded polymeric track may be advantageously used with a slide bar type suspension system.

This and other objects or advantages of the invention will be more apparent after reviewing the drawings and description thereof wherein.

DESCRIPTION OF PREFERRED EMBODIMENT

Figure 1:
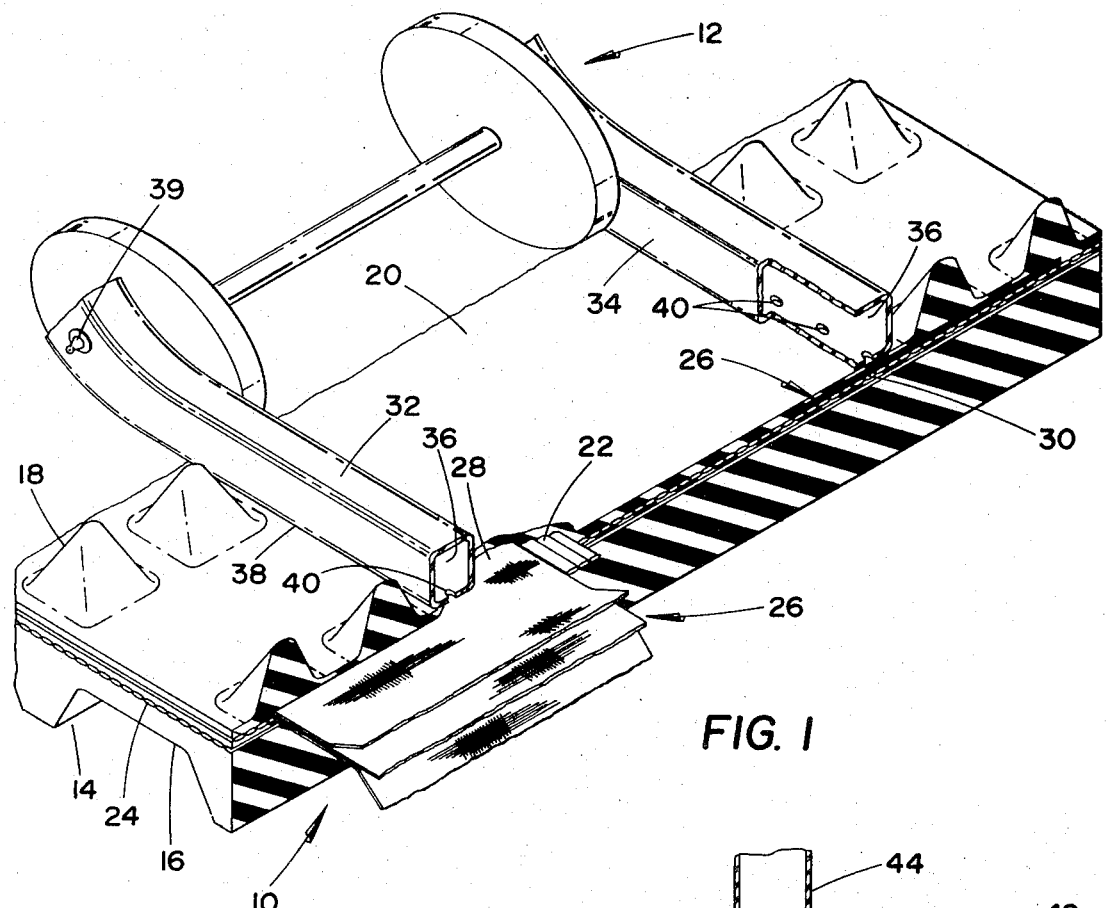
FIG. 1 is an isometric view of a short section of endless track incorporating an insulating material of the invention and supported by a slide bar of the invention.

In accordance with the invention, an endless track 10 and slide bar 12 are provided which individually or preferably together enhance the efficiency of an integrally molded track supported by a slide bar type suspension system. Referring particularly to FIG. 1, the track 10 of the invention is of the integrally molded polymeric type. The track 10 may be fabricated by any of known processes whether the polymeric material be natural or synthetic rubber, or a polyurethane. A tread pattern 14 may be formed on the outer surface 16 of the track and a drive means such as integrally molded lugs 18 may be formed along the inner surface 20 of the track. Other drive means such as sprocket teeth receiving openings, not shown, could be formed in the track without departing from the scope of the invention. The track 10 preferably includes a longitudinally oriented tensile section 22 and optionally, a transversely oriented reinforcement section 24. An insulating material 26 is disposed at or near and covers at least part of the track inner surface. Preferably, the insulating material is in longitudinally aligned strips 28, 30 and spaced in predetermined position juxtaposed a longitudinally aligned slide bar or bars 32, 34. Satisfactory insulating materials include the synthetic resin sold under the trade name "Nomex" as manufactured by DuPont, asbestos or a combination thereof. The insulator must have a melting or degeneration point higher than the melting or disintegration point of the polymeric material. Rubber materials start to disintegrate rapidly at temperatures around 300° F. while suitable polyurethanes melt at temperatures around 400° F. Nomex withstands temperatures of 700° F. while asbestos withstands even much higher temperatures. Another material which has applicable heat resistant properties is distributed under the trade name "Fiber B" as manufactured by DuPont. It is not intended to limit the scope of the invention to the above materials as a plurality of other heat resistant materials having the necessary insulating properties may well be used.

When a track 10 of the invention is used with a conventional slide bar that constantly or intermittently engages and lends support to the track, frictional heat is generated in sufficient quantity to char, melt, or otherwise disintegrate the polymeric materials to the depth of the insulator. Passage of heat to adjacent polymeric material is effectively retarded by the insulator. Track life is enhanced by the insulator as it keeps destructive heat away from the polymeric material. It has been determined to be desirable to locate any polymeric wheels away from that portion of the track that engages the slide bar as the heat retained in the insulator may be imparted to the wheels in sufficient quantity to cause physical degeneration thereof. The significant improvement of the track of the invention is illustrated by the following example.

EXAMPLE I

An integrally molded polyurethane track of the invention was constructed and installed on a snowmobile for testing purposes. Two strips of longitudinally oriented insulating material, each including four plies of 0.017 gauge Nomex, were disposed in the track near its inner surface. The track was supported with a conventional slide bar system of the parallel bar type where the slide bars were oriented to be juxtaposed the insulating strips. The snowmobile was operated over crusted snow which afforded a minimum of lubricous terrain for the slide bars which were instrumented for temperature. The slide bar temperature ranged from 200° to 300° F. for a distance that exceeded ½ mile. The track temperature at the insulator was sufficient to initiate melting of idler wheels which were positioned in longitudinal alignment with the slide bars. The track indicated slight amounts of wear and it is estimated from the wear that the track could have continued to operate for at least an additional 5 miles before ultimate failure. Comparatively, a track not having the insulator strip operated under similar terrain conditions for a distance of approximately 50 feet whereupon the polyurethane of the track melted and seized with the slide bars rendering the snowmobile inoperative.

Figure 2:
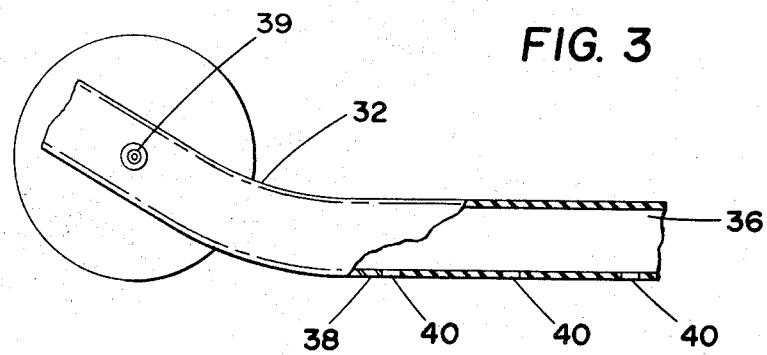
FIG. 2 is a partially cutaway side view of a short section of a slide bar of the invention.

Referring more particularly to FIG. 2, the slide bar 32 of the invention is a hollowed 36 or generally tubular member of any desired cross sectional shape. The track engaging surface 38 of the slide bar has a plurality of spaced openings 40. A heat liquefiable lubricant is disposed in the hollow 36 of the slide bar 32. The lubricant has physical properties such that it is highly viscous and will not flow from the holes at lower temperatures while at higher temperatures, for example around 100°–300° F., the lubricant liquefies and flows through the openings. Examples of heat sensitive lubricants are greases and waxes of petroleum or water base. More specifically, a petroleum grease sold under the trade name Fonoline Yellow and sold by Sonneborn Chemical is quite satisfactory. A satisfactory water base grease is sold by Union Carbide under the trade name Carbo Wax 1000. A means such as a grease fitting 39 is provided for filling the slide bars with lubricant. The number, size and location of the holes 40 may be varied as desired to allow for a desired excretion of the lubricant to a track of a track laying vehicle. Optionally a longitudinal groove may be extended between openings 40 to enhance distribution of the lubricant.

When the slide bar 32 of the invention is in use it is adapted to be in longitudinal alignment with a track laying vehicle. The slide bar may intermittently or constantly engage and support the inner surface of the track. When there is no lubricous terrain such as snow to reduce sliding friction between the slide bars and track, the slide bars and that portion of track that contacts the slide bars becomes hot. The lubricant liquefies and excretes through the holes 40 lubricating the track when sufficient frictional heat is generated. The temperature of the track and the slide bars immediately drops as lubricant is distributed over the slide running surface of the track. Lubricant in the slide bar congeals as the temperature drops which in turn stops lubricant from flowing through the holes 40. Lubricant is automatically dispensed in response to the rising and falling temperature of the track and slide bar. The performance of the self lubricating slide bar is illustrated by the following example.

EXAMPLE II

An integrally molded polyurethane track without insulator strips was installed on a snowmobile for testing purposes. The track was supported with the self lubricating slide bars of the invention. The slide bars were filled with Fonoline lubricant having a melting or free flowing temperature around 100° F. Parallel slide bars were used that were longitudinally aligned in relation to the vehicle. The snowmobile was operated over crusted snow that afforded a minimum of lubrication to the slide bars and track. Slide bar temperature increased to around 300° F. and then dropped to around 100°–125° F. as the Fonoline became fluid enough to be emitted through the holes and lubricate the track.

Again the temperature rose and dropped as cycling of the slide bar temperature continued as the heat sensitive lubricant repeatedly melted to automatically lubricate the track. The track indicated slight wear after running for over ½ mile. From the wear pattern it appeared the track would have operated an additional 2–3 miles.

Referring again to FIG. 1 the slide bars 32, 34 of the invention are juxtaposed over the insulative strips 28, 30 disposed in the track of the invention. Preferably, the insulating strips 28, 30 have a width at least equal to the width of the slide bars. The slide bars are preferably positioned a small distance, for example, around one-eighth to one-half inch away from the track by means of wheels. The track is free to intermittently or constantly engage the slide bars as the track is deflected theretoward. Any small amount of polymeric material over the insulating strips is free to rapidly wear away to expose the strips. The performance of the combination self-lubricating slide bars and insulated track of the invention is illustrated by the following example.

EXAMPLE III

An integrally molded polyurethane track with insulator strips of the invention was constructed and mounted on a snowmobile for testing. The track was supported by parallel slide bars. One slide bar was of conventional construction while the other slide bar was the self-lubricating type in accordance with the invention. The self-lubricating slide bar was filled with Fonoline grease. Again, the snowmobile was operated over crusted snow that afforded a minimum of natural lubrication to the slide bar and track. Slide bar temperatures increased to around 300° F. and then dropped to around 100°–125° F. as the heat sensitive lubricant melted. The track was inspected after one-half mile operation. The area of the track supported by the conventional slide bar showed wear similar to that of Example I whereas the area of track supported by the slide bar of the invention showed essentially zero wear. It is estimated that the track supported by the self-lubricating slide bar would be limited in life by the supply of lubricant available. One filling of the slide bar with lubricant was good for protecting the track for approximately 15 miles whereupon it was necessary to refill the slide bar.

EXAMPLE IV

To further evaluate the invention, a second series of tests were performed where a snowmobile equipped with a slide bar suspension system was operated over asphalt oval track. The snowmobile skis were replaced with wheels to facilitate the dry land operation. The slide bar suspension system used for the test was similar to that as disclosed in FIG. 2 of U.S. Pat. No. 3,637,265, except for a lubricating system which was additionally included in accordance with this invention. Asphalt temperatures during the test series ranged generally between 95° and 120° F. Various combinations of track construction and lubricating arrangements were tested.

The first test of the series was on an integrally molded track having a construction similar to that as disclosed in U.S. Pat. No. 3,582,154. . No lubricant was placed in the slide bars to establish how far an integrally molded track might run under dry conditions. The track lasted for 2.8 miles while operating at 15 mph.

Comparatively, the second test of the series employed a track similar in construction to that of Test 1 except that an insulator fabric strip was added in accordance with the invention to be juxtaposed the slide bars of the track suspension system. The track was operated at 15 mph for 13.5 miles after which speed was increased to 30 mph for an additional 14.5 miles whereupon the track became essentially inoperative. Thus, the track including the insulator strip of the invention was operative ten times further than the track of Test 1.

For Test 3 a track having the same construction as the track of Test 1 was operated with the slide bar suspension and grease was disposed in the slide bars. One side of the slide bars were filled with a petroleum based grease having a melting temperature of 100° F. whereas the opposite side of slide bars were filled with a water based grease having a melting temperature of 90° F. The track operated for 20 miles without any damage at speed of 15 and 30 mph on one grease filling. The track was operated an additional 2 miles before any track damage became apparent. It is estimated that the track would have operated indefinitely were the slide bars maintained with lubricant. The petroleum and water based lubricants worked equally well.

A track having strips of insulating material was used in conjunction with a slide bar that included grease for the fourth test. The track operated for 15 miles without any damage as lubricant was supplied via the slide bars. The track was operated an additional mile before any wear became apparent. The heat properties of the insulating materials caused the lubricant to be dispersed from the slide bars at a faster rate than was experienced during Test 3. Were the slide bars to be maintained with lubricant, it is estimated the track would last indefinitely. The track was then operable in a completely dry condition for an additional 10 miles.

ADDITIONAL SPECIES

Figure 3:
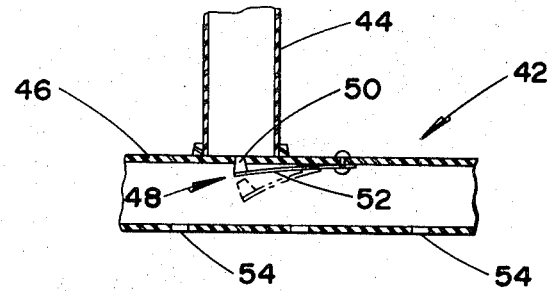
FIG. 3 is a cutaway side view showing an alternate form for the slide bar.

An alternate form of a slide bar 42 of the invention is shown in FIG. 3. In some applications, it may be advantageous to use a lubricant which is fluid at ambient temperatures. Lubricant is supplied from a reservoir, not shown, and through a conduit 44 to a hollowed member 46. A thermally responsive valve 48 is provided between the conduit and hollowed member to control lubricant flow from the reservoir in response to track temperature. The valve includes a movable poppet 50 supported by a bil-metal spring 52.

In operation the reservoir is filled with a lubricant. The lubricant fills the conduit 44 to the valve 48. As the hollowed members temperature increases, the bi-metal spring 52 deflects permitting lubricant to flow past the poppet 50. The lubricant flows through the hollowed member 46 and to the track through a plurality of spaced holes 54.

In summary, the insulated track or self-lubricating slide bar of the invention, individually improve the performance of an integrally molded polymeric track that is supported by slide bars. In combination, the insulated track and self lubricating slide bar greatly improved performance over the prior art.

The foregoing detailed description is presented for purpose of examination only and is not intended to limit the scope of the invention which is to be determined from the following claims.

What is claimed is:

1. An endless track of the integrally molded polymeric material type for use with the slide bar suspension system of a track laying vehicle, and having a tread portion defined of an outer surface, means for receiving a drive means from an inner surface, a tensile and transverse reinforcement, and wherein the improvement comprises:

an insulating material disposed in the track near and shrouding longitudinally at least part of the track inner surface, said insulating material being thermally stable at least generally 300° F. above the disintegration temperature of the polymeric material.

2. A track as set forth in claim 1 wherein said insulating material includes at least two generally parallel strips oriented longitudinally in relating to the track inner surface, said strips having a predetermined parallel spacing to be in alignment with slide bars of the slide bar suspension system.

3. A track as set forth in claim 1 wherein the insulating material includes one fabric layer selected from the group consisting of Nomex, asbestos, and Fiber B.

* * * * *